June 25, 1940.   K. WOLFRAM   2,205,510
CHANGE-OVER TORQUE MEASURING TOOL FOR SEVERAL MEASURING RANGES
Filed April 25, 1939
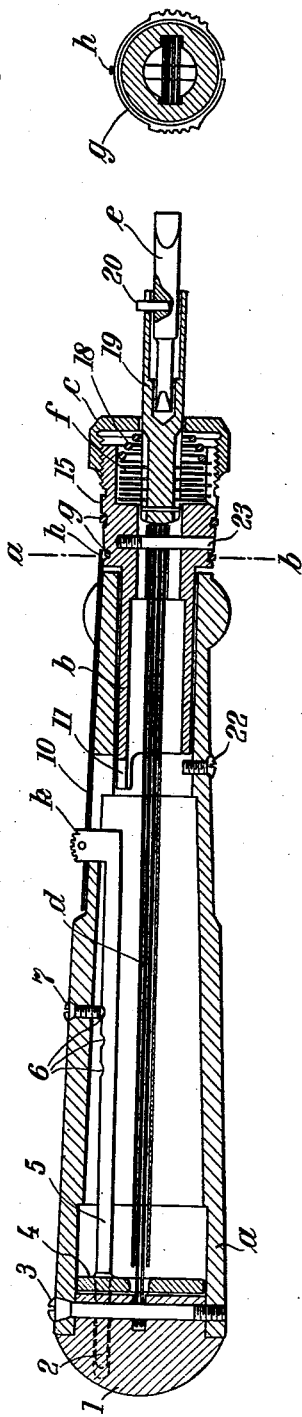
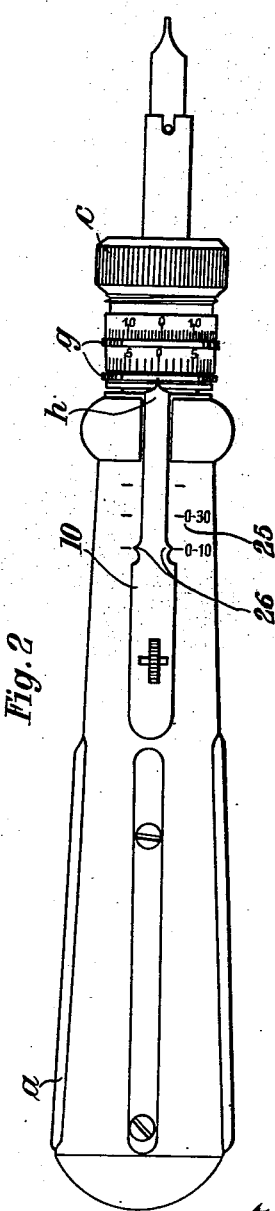
Inventor:
Karl Wolfram
his attorney Patented June 25, 1940

2,205,510

UNITED STATES PATENT OFFICE 2,205,510

CHANGE-OVER TORQUE MEASURING TOOL FOR SEVERAL MEASURING RANGES

Karl Wolfram, Vollme, Germany

Application April 25, 1939, Serial No. 269,877
In Germany April 7, 1938

2 Claims. (Cl. 265—1)

The tightening of screws, whether by hand or machine, through the intermediary of a ratchet coupling, was hitherto effected according to judgment that is solely according to the sense of touch. It frequently happens that the screws in some instances were driven home too tightly and stripped or broke off, and in other instances were not screwed home sufficiently tightly and consequently worked loose.

To overcome this objection a tool for measuring the moment torque has been designed by which the screws all receive a uniform previously adjusted maximum permissible torque when being tightened. This tool can also be used both as a control tool for indicating all screws which are not screwed home. However, in order to obtain accurate values with this tool in the case of both small and large screws, it was necessary to make separate tools for different measuring ranges.

The object of the present invention is to overcome this disadvantage and to produce a tool which can be changed-over to different measuring ranges with the result that the price up to a certain measuring range is reduced and other advantages are attained.

An embodiment of the invention is illustrated by way of example in the accompanying drawing, in which:

Fig. 1 shows the tool in longitudinal section,
Fig. 2 shows the tool in elevation,
Fig. 3 is a section on line a—b of Fig. 1.

A steel band packet $d$ engages at the front end in longitudinal grooves in and is rigidly connected by a screw 23 to a scale head $b$ mounted in a hollow handle $a$. At the other end only the two inner of the four steel bands of the packet are held in an end closing piece 1 of the handle $a$ by means of a screw 3. The two outer bands are shorter than the inner bands and their free ends, when the tool is used in the position shown in the drawing, can swing freely outwards. If, however, a slide 4 fixed on a rod 5 whose front end $k$ projects outwards through the handle, is shifted towards the right, the free ends of the outer steel bands will be held in the aperture in the slide so that the packet will be strengthened by these two outer bands. Any number of bands may be used and they may be stepped at three points. When the front end $k$ of the rod 5 is actuated, it shifts a cover plate 10 the front end of which forms a hand $h$ which slides on a torque measuring scale 15. When changing over from one tension step to another the hand $h$ is at the same time shifted on the scale relating to the particular step in question. By shifting the slide into its extreme right position the scale head is locked in that the end $k$ engages in a notch 11 in the scale head. A carrier ring $g$ grips lightly in a groove in front of each scale. These rings are shifted by hand and act as hand carriers. A plate clutch $f$ is fitted in the front end of the scale head and regulated by an adjusting nut $c$ that is restrained from accidental movements by the spring 18. The plate clutch $f$ consists of two sets of plates, one set secured to the scale head and the other set secured to the driving member 19. The plate clutch $f$ forms a connection between the scale head and the driving member 19 and is of the over-load releasing type. The driving member 19 is constructed as screw driver element and serves for receiving a screw driver $e$, which is locked against rotation by a pin 20. An abutment screw 22 cooperating with the end of the scale head carrying the notch 11 prevents over torsioning of the packet. The slide is held in its different positions by a screw 7 engaging in notches 6 in the rod 5 whose rear end is guided in a bore 2 in the end closing piece 1. The free ends of the spring bands can be locked in some other manner. The scale 25 on handle $a$ and the cooperating pointer 26 on plate 10 indicate the strength of change-over torque occasioned by the number of bands $d$ that are confined.

I claim:

1. A change-over torque measuring tool for several measuring ranges, comprising in combination a hollow handle, a tool holder loosely mounted on the front end of said handle, a packet of blade springs fixed at one end to said holder, and change-over means shiftable in said handle for successively connecting the other ends of the blade springs to said handle to vary the strength of said packet.

2. In a tool as specified in claim 1, a plurality of scales on said tool holder, and a hand connected to the change-over means adapted to cooperate with said scales to indicate the torque in the packet and to shift from one scale to another according to the strength of said packet determined by the position of said means.

KARL WOLFRAM.